United States Patent
Tian et al.

(10) Patent No.: US 10,372,610 B2
(45) Date of Patent: Aug. 6, 2019

(54) PREFETCHING DATA FOR APPLICATION USAGE

(71) Applicant: PayPal, Inc., San Jose, CA (US)

(72) Inventors: Cheng Tian, San Jose, CA (US); Braden Christopher Ericson, San Jose, CA (US); Titus Woo, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 20 days.

(21) Appl. No.: 15/675,453

(22) Filed: Aug. 11, 2017

(65) Prior Publication Data
US 2019/0050338 A1    Feb. 14, 2019

(51) Int. Cl.
*G06F 12/00*   (2006.01)
*G06F 12/0862*   (2016.01)

(52) U.S. Cl.
CPC .... *G06F 12/0862* (2013.01); *G06F 2212/602* (2013.01); *G06F 2212/6024* (2013.01); *G06F 2212/6026* (2013.01); *G06F 2212/6028* (2013.01)

(58) Field of Classification Search
CPC .......... G06F 12/0862; G06F 2212/602; G06F 2212/6024; G06F 2212/6026; G06F 2212/6028
See application file for complete search history.

(56) References Cited

U.S. PATENT DOCUMENTS 10,038,761 B1 * 7/2018 Lekkalapudi ........... H04L 67/34

* cited by examiner

*Primary Examiner* — Shawn X Gu
(74) *Attorney, Agent, or Firm* — Haynes and Boone, LLP (57) ABSTRACT

A computer system monitors usage of an application on a computing device to identify one or more pre-fetch situations corresponding to a user of the computing device. The computer system determines whether the computing device is in a situation that corresponds to at least one of the identified one or more pre-fetch situations. In response to determining that the computing device is in the situation that corresponds to the at least one of the identified one or more pre-fetch situations, the computer system causes data corresponding to the application to be pre-fetched.

20 Claims, 6 Drawing Sheets

PREFETCHING DATA FOR APPLICATION USAGE

TECHNICAL FIELD

The present disclosure relates generally to utilization of applications, and more particularly to prefetching data for the utilization of an application.

BACKGROUND

In today's age, users have an ever-increasing number of applications on their computing devices and mobile devices. Along with taking up storage space, some applications may take up a significant amount of computing resources when loading, oftentimes, adding to the frustration level of a user. In a world where customers demand to have their digital devices work and load applications more fast than ever, it would be advantageous to have a solution, that would allow a customer to utilize an application, even large applications, without having to wait for the application to load.

DETAILED DESCRIPTION

Embodiments of the present disclosure provide a system, method, and program product. A computer system monitors usage of an application on a computing device to identify one or more pre-fetch situations corresponding to a user of the computing device. The computer system determines whether the computing device is in a situation that corresponds to at least one of the identified one or more pre-fetch situations. In response to determining that the computing device is in the situation that corresponds to the at least one of the identified one or more pre-fetch situations, the computer system causes data corresponding to the application to be pre-fetched.

In the example embodiment, the present disclosure describes a solution to the problem of enhancing the speed at which a user device is able to load an application. The present disclosure describes a solution that determines one or more devices within a vicinity of a device of a user, and further determines that the one or more devices are currently executing a first application. The present disclosure further describes determining an amount of the one or more devices that correspond to one or more users that are associated with the user, and additionally determining if the determined amount exceeds a threshold amount. If the determined amount exceeds the threshold amount, the device of the user pre-fetches data corresponding to the first application so that the first application can be loaded on the device of the user in a more timely and efficient manner. In the example embodiment, the present disclosure describes a solution to the problem of enhancing the speed at which a user device is able to load an application, by utilizing information (about applications currently being executed) determined about nearby devices that correspond to users that are associated with the user of the device.

In the example embodiment, the present solution further describes a solution to the problem of enhancing the speed at which a specific portion, such as a specific page or interface, of an application may be loaded. The present disclosure describes a solution that determines one or more devices within a vicinity of a device of a user, and further determines that the one or more devices are currently executing a first application. The present disclosure further describes determining an amount of the one or more devices that correspond to one or more users that are associated with the user, and additionally determining if the determined amount exceeds a first threshold amount. If the determined amount exceeds the first threshold amount, the present disclosure describes determining an amount of the one or more users that are associated with the user, and whose current utilization of the application corresponds to a certain type of usage (or common transaction type). If the amount of the one or more users that are associated with the user, and whose current utilization of the application corresponds to a certain type of usage (or common transaction type) exceeds a second threshold amount, the present disclosure describes transmitting a notification to the user that includes a selectable element that corresponds (or links) to the common transaction type, therefore allowing the user to access the specific page or transaction (or portion of transaction) without having to navigate to it.

Embodiments of the present disclosure will now be described in detail with reference to the accompanying Figures.

Figure 1:
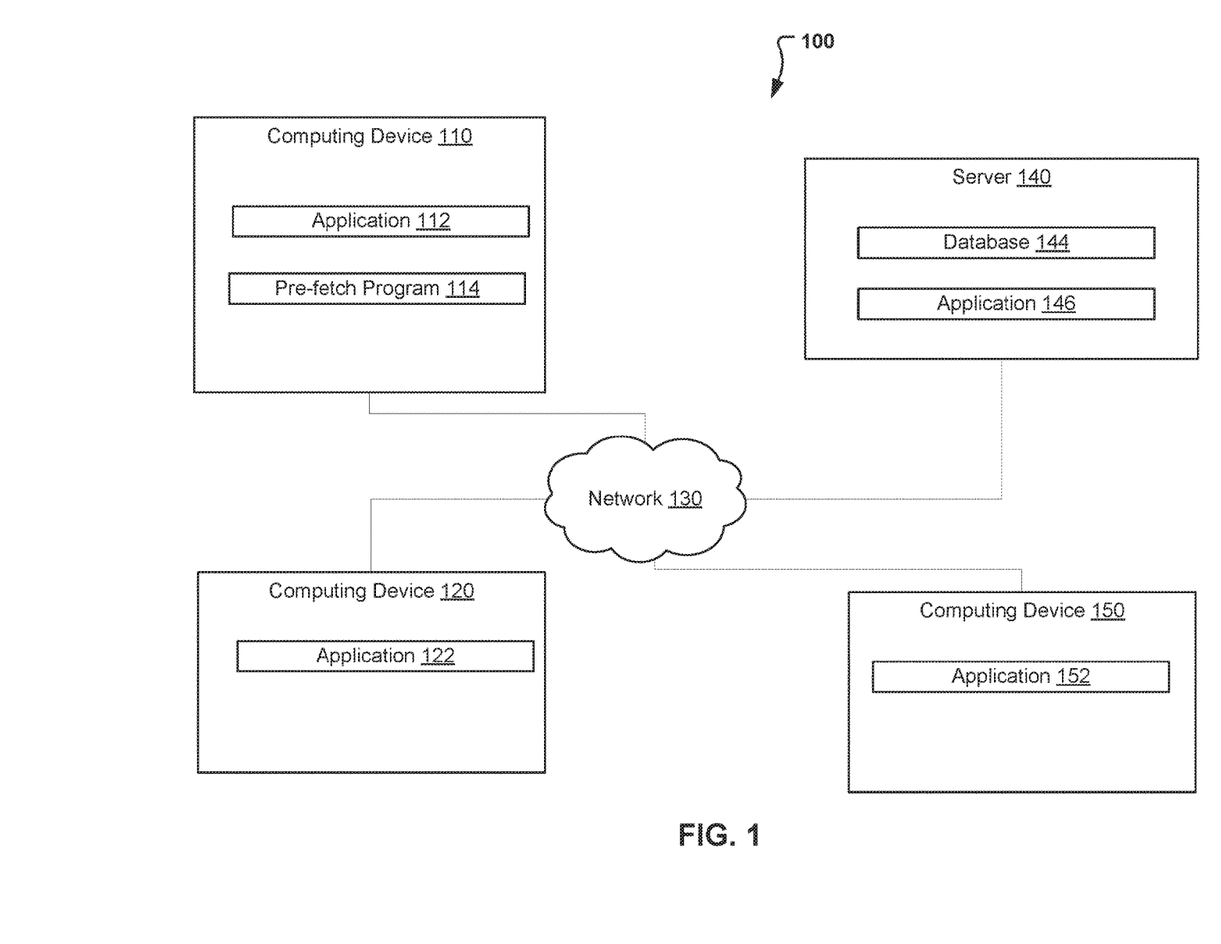
FIG. 1 illustrates a pre-fetch system, in accordance with an embodiment.

FIG. 1 illustrates a pre-fetch system 100, in accordance with an embodiment. In the example embodiment, pre-fetch system 100 includes computing device 110, server 140, computing device 150, and computing device 120 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110, computing device 120, server 140, and computing device 150.

Computing device 120 includes application 122. In the example embodiment, computing device 120 is a computing device such as a smartphone, however in other embodiments, computing device 120 may be a desktop computer, a laptop computer, a tablet computer, a handheld device, a thin client, or any other electronic device or computing system capable of receiving and sending data to and from other computing devices, such as server 140, via network 130. Computing device 120 is described in more detail with reference to FIG. 5.

Application 122 is an application or program, such as a financial application, a social media application, a web browser, or another type of application. In the example embodiment, application 122 is a client side application of application 146 hosted on server 140. Application 122 is described in more detail with reference to FIGS. 2 and 3.

Computing device 150 includes application 152. In the example embodiment, computing device 150 is a computing device such as a smartphone, however in other embodiments, computing device 150 may be a desktop computer, a laptop computer, a tablet computer, a handheld device, a thin client, or any other electronic device or computing system capable of receiving and sending data to and from other computing devices, such as server 140, via network 130. Computing device 150 is described in more detail with reference to FIG. 5.

Application 152 is an application or program, such as a financial application, a social media application, a web browser, or another type of application. In the example embodiment, application 122 is a client side application of application 146 hosted on server 140. Application 152 is described in more detail with reference to FIGS. 2 and 3.

Server 140 includes application 146 and database 144. In the example embodiment, server 140 may be a desktop computer, a laptop computer, a tablet computer, a mobile device, a handheld device, a thin client, or any other electronic device or computing system capable of receiving and sending data to and from other computing devices, such as computing device 110, via network 130. Although not shown, optionally, server 140 can comprise a cluster of servers executing the same software to collectively process requests as distributed by a front end server and a load balancer. In the example embodiment, server 140 is a server that supports application 146. Server 140 is described in more detail with reference to FIG. 5.

Database 144 includes electronic content/information corresponding to one or more client side users of application 146. For example, database 144 may include information corresponding to the users of computing device 110, computing device 120, and computing device 150. In the example embodiment, database 144 may include information pertaining to one or more user accounts, such as email accounts, social media accounts, financial accounts, text message content, public records, or any other form of user account or content. For example, if application 146 is an email application, database 144 may be an email database that includes a repository of emails received and transmitted by each user that has an account with a specific email provider. Database 144 is described in further detail with regard to FIGS. 2 and 3.

Application 146 is an application or program, such as a financial application, a social media application, a web browser, or another type of application. In the example embodiment, application 112 is a server side application that communicates with client side applications, such as application 112, application 122, and application 152. Application 146 is described in more detail with reference to FIGS. 2 and 3.

Computing device 110 includes application 112 and pre-fetch program 114. In the example embodiment, computing device 110 is a computing device such as a smartphone, however in other embodiments, computing device 110 may be a desktop computer, a laptop computer, a tablet computer, a handheld device, a thin client, or any other electronic device or computing system capable of receiving and sending data to and from other computing devices, such as server 140, via network 130. Computing device 110 is described in more detail with reference to FIG. 5.

Application 112 is an application or program, such as a financial application, a social media application, a web browser, or another type of application. In the example embodiment, application 122 is a client side application of application 146 hosted on server 140. For example, application 112, application 122, and application 152 may all be a Venmo® application (Venmo is registered trademark of Paypal Inc.). Application 112 is described in more detail with reference to FIGS. 2 and 3.

In the example embodiment, pre-fetch program 114 is a program that is capable of identifying one or more pre-fetch situations corresponding to a user or user device, such as computing device 110. Pre-fetch program 114 is also capable of identifying if the user or user device is currently in a situation or environment that corresponds to at least one or more of the identified pre-fetch situations. Further, based on pre-fetch program 114 identifying that the user or user device is currently in a situation or environment that correspond to at least one or more of the identified pre-fetch situations, pre-fetch program 114 is capable of pre-fetching data for an application on computing device 110, such as application 112. In the example embodiment, pre-fetch program 114 is also capable of determining whether one or more computing devices, such as computing device 120 and computing device 150, are within a certain distance of computing device 110 and currently executing a common application, such as application 122 and application 152. Further, pre-fetch program 114 is capable of determining an amount of the computing devices determined to be within the certain distance of computing device 110 that are associated with a user or users that correspond to the user of computing device 110. Furthermore, in response to determining the determined amount of computing devices exceeds a threshold amount, pre-fetch program 114 is capable of causing application 112 to pre-fetch data, which may help application 112 load or execute more efficiently. In addition, pre-fetch program 114 is capable of determining a current utilization of the common application executing on computing device 120 and computing device 150, and based on the determined current utilization, pre-fetch program 114 is capable of creating and presenting a notification to the user of computing device 110 that includes a selectable element corresponding to the determined current utilization. The operations of pre-fetch program 114 are described in further detail with regard to FIGS. 2 and 3.

Figure 2:
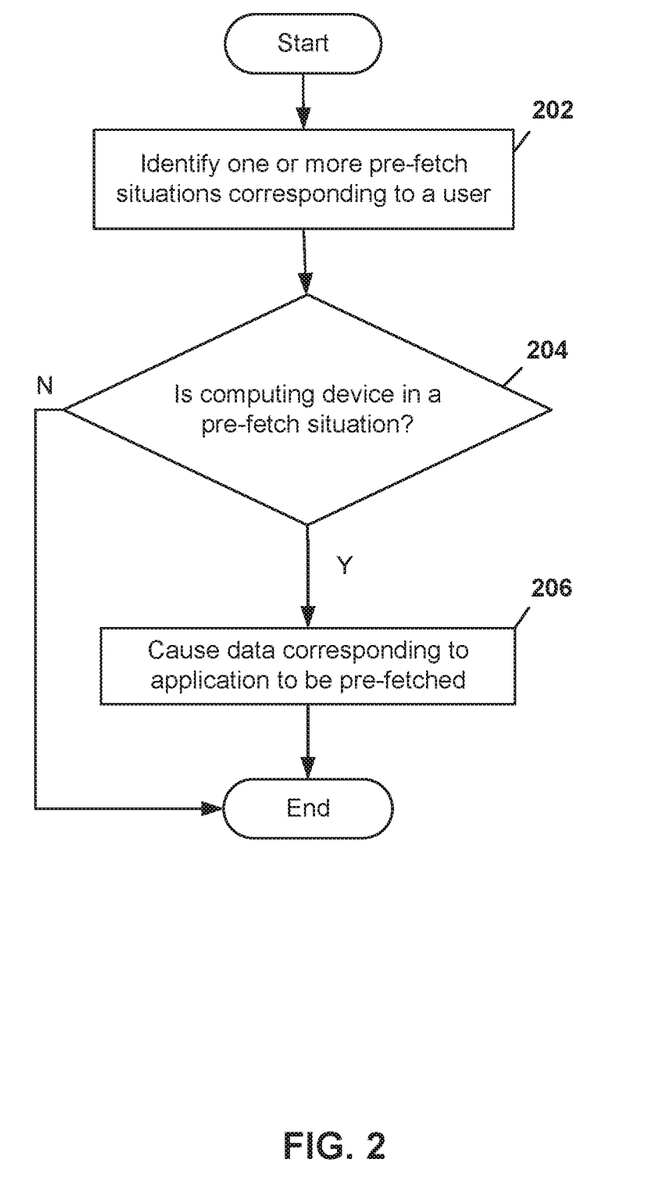
FIG. 2 is a flowchart illustrating the operations of the pre-fetch program of FIG. 1 in identifying one or more pre-fetch situations corresponding to a user, and further pre-fetching data for an application based on identification of a pre-fetch situation, in accordance with an embodiment.

FIG. 2 is a flowchart illustrating the operations of pre-fetch program 114 in identifying one or more pre-fetch situations corresponding to a user, and further pre-fetching data for an application based on identification of a pre-fetch situation, in accordance with an embodiment.

In the example embodiment, pre-fetch program 114 identifies one or more pre-fetch situations corresponding to a user or user device, such as computing device 110 (step 202). In the example embodiment, pre-fetch program 114 may monitor usage of computing device 110, and further utilize machine-learning techniques to determine situations or environments when the user of computing device 110 is likely to open up application 112. Each determined situation or environment may then be stored as a pre-fetch situation in association with computing device 110 or the user of computing device 110. For example, pre-fetch program 114 may monitor usage of computing device 110 to determine that the user of computing device 110 does not utilize application 112 when located in a specific location, on a specific day(s), or during a specific time of day. In one example, pre-fetch program 114 may monitor usage of computing device 110 and determine that the user of computing device 110 often utilizes application 112 when located in a tourist area, or marketplace, such as a shopping mall or a bazaar (for example, by determining whether the percentage of usage by the user of computing device 110 of application 112 when located in the location type exceeds a threshold percentage). In another example, pre-fetch program 114 may determine that the user of computing device 110 often utilizes application 112 when surrounded by users that are utilizing their computing or mobile devices. In this example, pre-fetch program 114 may, over a period of time, detect an amount of device usage within a certain vicinity of computing device 110, and further monitor whether each detected instance leads to the user of computing device 110 utilizes application 112. Pre-fetch program 114 may then utilize machine learning techniques to identify a threshold amount of device usage that when exceeded correlates to the user of computing device 110 utilizing application 112. Pre-fetch program 114 may then store the threshold amount of device usage as a pre-fetch situation associated with computing device 110 or the user of computing device 110.

In another example, pre-fetch program 114 may determine that the user of computing device 110 often utilizes application 112 when surrounded by a threshold amount of users that are utilizing the application on their respective devices. For example, if application 112 is a specific finance application, pre-fetch program 114 may, over a time period, detect, via network 130, an amount of devices that are currently executing the specific financial application that are further within a certain vicinity of computing device 110, and further monitor whether each detected instance leads to the user of computing device 110 utilizing application 112. In a similar manner as stated above, pre-fetch program 114 may then utilize machine-learning techniques to identify a threshold amount of detected devices currently executing the specific financial application, that when exceeded correlates to the user of computing device 110 utilizing application 112. Pre-fetch program 114 may then store the threshold amount of detected devices currently executing the specific application as a pre-fetch situation associated with computing device 110 or the user of computing device 110. In other embodiments, pre-fetch program 114 may detect and monitor usage by nearby computing devices via a Bluetooth Low Energy (BLE), LTE Direct, or other communication protocol. In the example embodiment, the phrase "often utilizes" may refer to situations where the user of computing device 110 utilizes application 112 more than a threshold percentage of the time. For example, pre-fetch program 114 may determine that the user of computing device 110 often utilizes application 112 when surrounded by a threshold amount of users that are utilizing the application on their respective devices by determining having the threshold amount of users (or more than the threshold amount of users) currently utilizing the application within a vicinity of the user of computing device 110 causes the user of computing device 110 to utilize application 112 more than a threshold percentage of the time.

In an additional example, pre-fetch program 114 may monitor usage of additional applications in determining pre-fetch situations. For example, pre-fetch program 114 may, by way of monitoring, determine that if a threshold amount of computing devices in the pre-determined vicinity utilize a first application or a second application, the user of computing device 110 often launches or utilizes a third application. Therefore, pre-fetch program 114 may store this situation as a pre-fetch situation.

Furthermore, pre-fetch program 114 may determine a threshold amount of devices of friends or people associated with the user of computing device 110 currently executing the specific application, that when exceeded correlates to the user of computing device 110 utilizing application 112. In addition, pre-fetch program 114 may determine a threshold amount of device usage of friends or people associated with the user of computing device 110, which when exceeded correlates to the user of computing device 110 utilizing application 112. These examples are described in more detail with regard to FIGS. 3 and 4. Furthermore, as stated above, in each example, pre-fetch program 114 may store the identified pre-fetch situation in association with the computing device 110 or the user of computing device 110.

Pre-fetch program 114 monitors the usage of computing device 110 and also the environment of computing device 110 to determine whether computing device 110 is in a pre-fetch situation (decision 204). In the example embodiment, pre-fetch program 114 predicts whether the user of computing device 110 may utilize application 112 by determining whether computing device in is a pre-fetch situation. Further, in the example embodiment, pre-fetch program 114 determines whether computing device 110 is in a pre-fetch situation by monitoring the current usage and environment of computing device 110 and comparing the monitored current usage and environment to the stored pre-fetch situations. For example, if a location within a marketplace is stored as a pre-fetch situation and pre-fetch program 114 monitors computing device 110 and determines that the location of computing device 110 is in a marketplace or a bazaar, pre-fetch program 114 compares the location information to the stored pre-fetch situations and determines that the current usage of computing device 110 denotes that computing device 110 is in a pre-fetch situation. In another example, if pre-fetch program 114 monitors the current environment of computing device 110, and determines that an amount of devices of friends or people associated with the user of computing device 110 currently executing the specific application exceeds the pre-determined threshold amount of devices of friends or people associated with the user of computing device 110 currently executing the specific application (stored in association with computing device 110), pre-fetch program 114 determines that computing device 110 is currently in a pre-fetch situation.

If pre-fetch program 114 determines that computing device 110 is not in a pre-fetch situation (decision 204 "NO" branch), pre-fetch program 114 continues monitoring the usage of computing device 110 and the environment of computing device 110 to determine if a pre-fetch situation arises.

If pre-fetch program 114 determines that computing device 110 is in a pre-fetch situation (decision 204, "YES" branch), pre-fetch program 114 transmits a message to application 112 which causes application 112 to pre-fetch the relevant data. In the example embodiment, pre-fetching the relevant data allows application 112 to be launched in a faster, more efficient manner. In other embodiments, pre-fetch program 114 may cause application 112 to pre-fetch data corresponding to a particular process or transaction so that the particular process or transaction may be executed in a faster, more efficient manner. For example, pre-fetch program 114 may cause a specific portion of application 112 to be pre-fetched so that the specific portion may be loaded in an efficient manner. For example, pre-fetch program 114 may monitor usage of computing device 110 and utilize machine-learning techniques to determine that in a specific pre-fetch situation, the user of computing device 110 utilizes application 112 to perform a specific transaction. For instance, pre-fetch program 114 may determine that in a pre-fetch situation of computing device 110 being located in a specific market, application 112 is typically utilized to transact with a friend. Therefore, pre-fetch program 114 may cause application 112 to pre-fetch data that may facilitate the loading or executing of application 112 with regard to performing an electronic transaction with the specific friend. Furthermore, in the case of a specific set of friends being associated with the specific market, pre-fetch program 114 may cause application 112 to pre-fetch data so that application 112 may present the user of computing device 110 an option to select a friend from the set of friends for the purpose of performing the electronic transaction. In further embodiments, rather than causing application 112 to pre-fetch data, pre-fetch program 114 may pre-fetch the data for use by application 112 in loading and/or executing in a more efficient manner.

Figure 3:
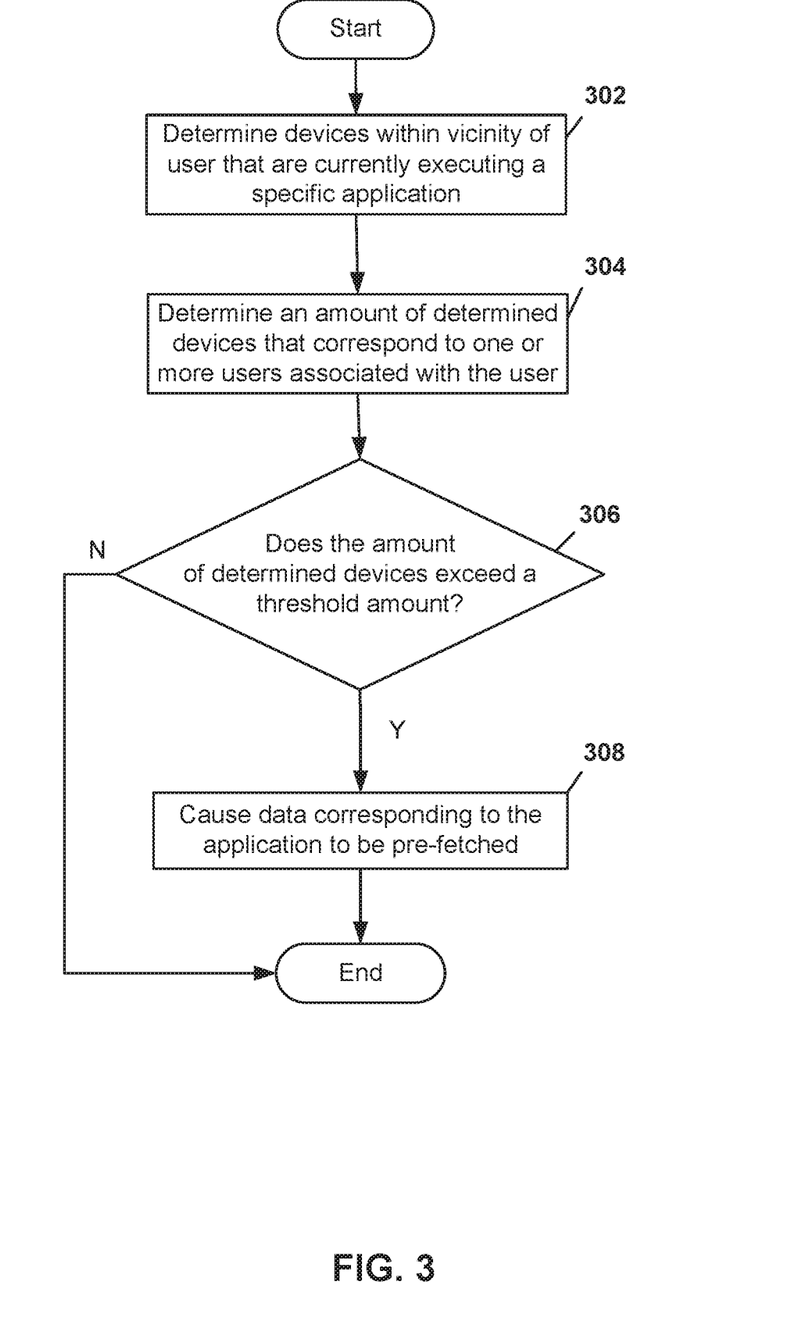
FIG. 3 is a flowchart illustrating the operations of the pre-fetch program of FIG. 1 in predicting whether a user may utilize an application and based on the prediction, pre-fetching data corresponding to the application, in accordance with an embodiment.

FIG. 3 is a flowchart illustrating the operations of pre-fetch program 114 in predicting whether a user may utilize an application and based on the prediction, pre-fetching data corresponding to the application, in accordance with an embodiment.

In the example embodiment, pre-fetch program 114 determines devices that are within the vicinity of the user of computing device 110 and further, that are currently executing a specific application (step 302). For example, pre-fetch program 114 may detect, via network 130, that computing device 120 and computing device 150 are within a pre-determined vicinity of computing device 110. In addition, in this example, pre-fetch program 114 may further detect, via network 130, that computing device 120 is currently executing application 122, and computing device 150 is currently executing application 152 (with application 122 and application 152 being client side applications of application 146). In the example embodiment, the pre-determined vicinity may be determined via machine learning techniques in a similar manner as described above. For example, pre-fetch program 114 may, over a period of time, monitor the usage of computing device 110 and also computing devices within the environment of computing device 110. Pre-fetch program 114 may utilize machine learning techniques to identify that the user of computing device 110 often utilizes application 112 when there are other users present within the certain vicinity utilizing their respective computing device (for example to execute client version of application 146). Pre-fetch program 114 may store this situation as a pre-fetch situation, as described above, and the identified certain vicinity may be the pre-determined certain vicinity referenced above. In other embodiments, pre-fetch program 114 may prompt the user of computing device 110 to input the vicinity.

Pre-fetch program 114 determines an amount of the determined devices that are associated with a user (or one or more users) that correspond to the user of computing device 110 (step 304). In the example embodiment, pre-fetch program 114 references database 144 in order to identify whether the user of the determined devices correspond to the user of computing device 110. For example, if application 146 is a financial application, database 144 may include user account information associated with the user of computing device 110 that contains information such as past transactions involving the user of computing device 110. In this example, pre-fetch program 114 may analyze the past transaction information to identify whether the user of computing device 110 has transacted with the user or users associated with the determined devices. If pre-fetch program 114 determines that the user of computing device 110 has transacted with the user or users associated with the determined devices, pre-fetch program 114 may determine that the user or users associated with the determined devices correspond to the user of computing device 110. In other embodiments, pre-fetch program 114 may, in addition to referencing the database associated with application 146 (i.e., database 144), reference additional databases and resources, such as social media accounts, financial accounts, email accounts, text message content, phone contacts, public records, an electronic calendar associated with the user of computing device 110 and/or any other form of user account or content, in order to determine whether the user or users associated with the determined devices correspond to the user of computing device 110.

Pre-fetch program 114 predicts whether the user of computing device 110 will utilize application 112 by determining whether the amount of the determined devices that are associated with a user (or one or more users) that correspond to the user of computing device 110 exceeds a threshold amount (decision 306). In the example embodiment, pre-fetch program 114 may utilize machine-learning techniques to determine the threshold amount in a similar manner as stated above. In other embodiments, pre-fetch program 114 may prompt the user to input the threshold amount.

If pre-fetch program 114 determines that the amount of the determined devices that are associated with a user (or one or more users) that correspond to the user of computing device 110 does not exceed the threshold amount (decision 306, "NO" branch), pre-fetch program 114 continues monitoring the usage of computing device 110 and the computing devices in the pre-determined vicinity of computing device 110.

If pre-fetch program 114 determines that the amount of the determined devices that are associated with a user (or one or more users) that correspond to the user of computing device 110 does exceed the threshold amount (decision 306, "YES" branch), pre-fetch program 114 transmits a message (or a signal) to application 112 instructing application 112 to pre-fetch the relevant data (which causes application 112 to pre-fetch the relevant data) (step 308). In the example embodiment, as stated above, pre-fetching the relevant data allows application 112 to be launched in a faster, more efficient manner. In other embodiments, as stated above, pre-fetch program 114 may cause application 112 to pre-fetch data corresponding to a particular process or transaction so that the particular process or transaction may be executed in a faster, more efficient manner. For example, pre-fetch program 114 may cause a specific portion of application 112 to be pre-fetched so that the specific portion may be loaded in an efficient manner. In further embodiments, rather than causing application 112 to pre-fetch data, pre-fetch program 114 may pre-fetch the data for use by application 112 in loading and/or executing in a more efficient manner.

In further embodiments, pre-fetch program 114 may first determine devices within the vicinity of computing device 110 that correspond to one or more users that are associated with computing device 110, and then further determine an amount of the determined devices (devices within the vicinity of computing device 110 and corresponding to one or more users that are associated with computing device 110) that are currently executing the specific application. Furthermore, pre-fetch program 114 may compare the determined amount to a threshold amount, and based on the comparison, pre-fetch data or cause application 112 to pre-fetch data in the same manner as described above.

Figure 4:
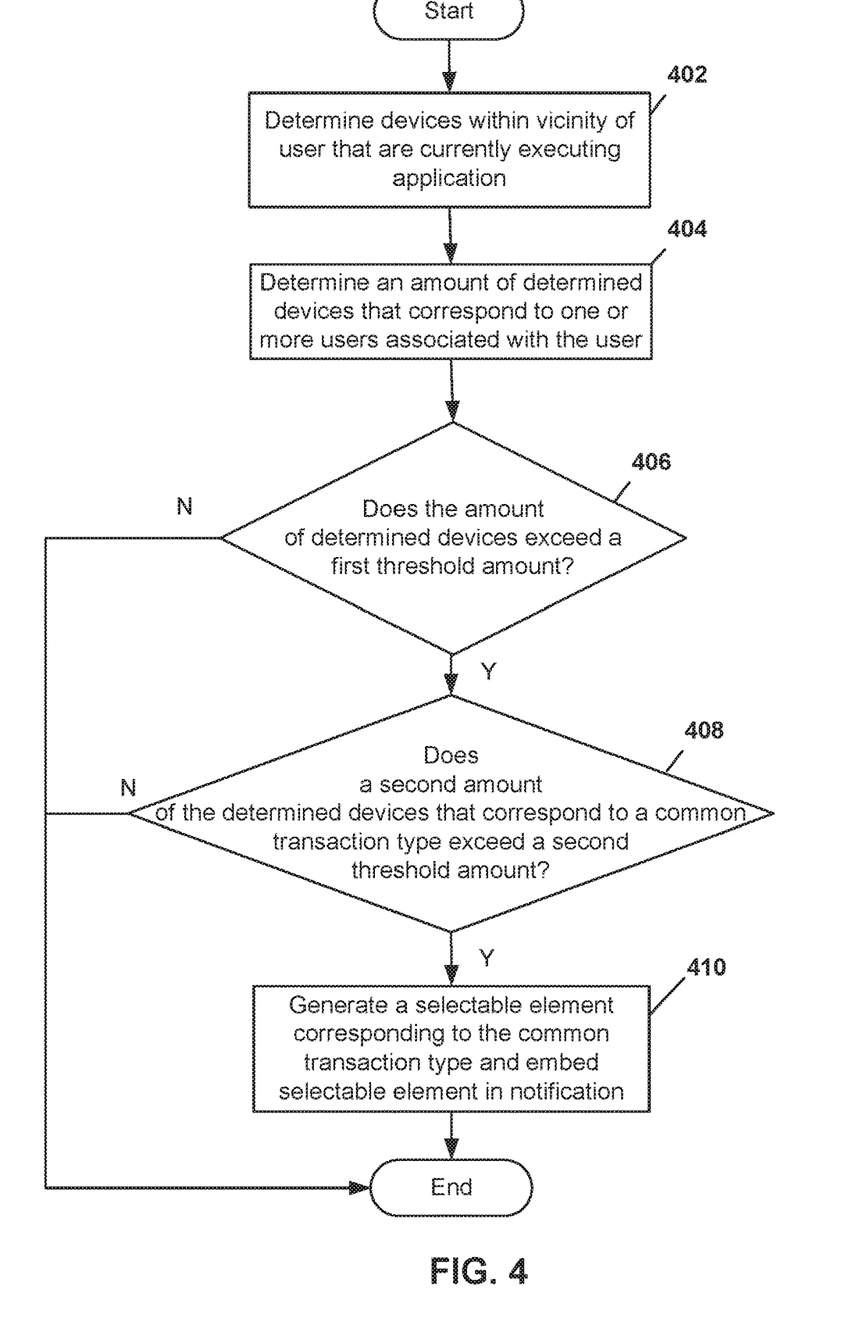
FIG. 4 is a flowchart illustrating the operations of the pre-fetch program of FIG. 1 in predicting whether the user of computing device 110 may utilize an application to perform a certain transaction type, and based on the prediction, transmitting a selectable element corresponding to the certain transaction type, in accordance with an embodiment.

FIG. 4 is a flowchart illustrating the operations of pre-fetch program 114 in predicting whether the user of computing device 110 may utilize an application to perform a certain transaction type, and based on the prediction, transmitting a selectable element corresponding to the certain transaction type, in accordance with an embodiment. In the example embodiment, pre-fetch program 114 determines devices that are within the vicinity of the user of computing device 110 and further, that are currently executing a specific application (step 402). For example, as stated above, pre-fetch program 114 may detect, via network 130, that computing device 120 and computing device 150 are within a pre-determined vicinity of computing device 110. In addition, in this example, pre-fetch program 114 may further detect, via network 130, that computing device 120 is currently executing application 122, and computing device 150 is currently executing application 152 (with application 122 and application 152 being client side applications of application 146). In the example embodiment, as stated above, the pre-determined vicinity may be determined via machine learning techniques in a similar manner as described above. For example, pre-fetch program 114 may, over a period of time, monitor the usage of computing device 110 and also computing devices within the environment of computing device 110. Pre-fetch program 114 may utilize machine learning techniques to identify that the user of computing device 110 often utilizes application 112 when there are other users present within the certain vicinity utilizing their respective computing device (for example to execute a client version of application 146). Pre-fetch program 114 may store this situation as a pre-fetch situation, as described above, and the identified certain vicinity may be the pre-determined certain vicinity referenced above. In other embodiments, pre-fetch program 114 may prompt the user of computing device 110 to input the vicinity.

Pre-fetch program 114 determines an amount of the determined devices that are associated with a user (or one or more users) that correspond to the user of computing device 110 (step 404). In the example embodiment, as stated above, pre-fetch program 114 references database 144 in order to identify whether the user of the determined devices correspond to the user of computing device 110. For example, if application 146 is a financial application, database 144 may include user account information associated with the user of computing device 110 that contains information such as past transactions involving the user of computing device 110. In this example, pre-fetch program 114 may analyze the past transaction information to identify whether the user of computing device 110 has transacted with the user or users associated with the determined devices. If pre-fetch program 114 determines that the user of computing device 110 has transacted with the user or users associated with the determined devices, pre-fetch program 114 may determine that the user or users associated with the determined devices correspond to the user of computing device 110. In other embodiments, as stated above, pre-fetch program 114 may not only reference the database associated with application 146 (i.e., database 144), pre-fetch program 114 may reference additional databases and resources, such as social media accounts, financial accounts, email accounts, text message content, phone contacts, public records, an electronic calendar associated with the user of computing device 110 and/or any other form of user account or content, in order to determine whether the user or users associated with the determined devices correspond to the user of computing device 110.

Pre-fetch program 114 determines whether the amount of the determined devices that are associated with a user (or one or more users) that correspond to the user of computing device 110 exceeds a first threshold amount (decision 406). In the example embodiment, pre-fetch program 114 may utilize machine-learning techniques to determine the first threshold amount in a similar manner as stated above. In other embodiments, pre-fetch program 114 may prompt the user to input the first threshold amount. In the example embodiment, the first threshold amount is the same as the threshold amount discussed in decision step 306 (discussed above), however, in further embodiments, the first threshold amount may be a different amount than the threshold amount discussed in decision step 306.

If pre-fetch program 114 determines that the amount of the determined devices that are associated with a user (or one or more users) that correspond to the user of computing device 110 does not exceed the first threshold amount (decision 406, "NO" branch), pre-fetch program 114 continues monitoring the usage of computing device 110 and the computing devices in the pre-determined vicinity of computing device 110.

If pre-fetch program 114 determines that the amount of the determined devices that are associated with a user (or one or more users) that correspond to the user of computing device 110 does exceed the first threshold amount (decision 406, "YES" branch), pre-fetch program 114 determines a second amount of devices, from the determined devices that are associated with a user (or one or more users) that correspond to the user of computing device 110, that correspond to a common transaction type, and further determines whether the second amount of devices exceeds a second threshold amount (decision 408). For example, if pre-fetch program 114 determines that computing device 120 and computing device 150 are located within a pre-determined vicinity of computing device 110, and are further associated with a user or users that correspond to the user of computing device 110, pre-fetch program 114 determines whether each device (computing device 120 and computing device 150) is currently utilizing application 122 and application 152, respectively, to execute a common transaction type. In the example embodiment, a transaction type may correspond to a specific type of electronic transaction such as an electronic financial transaction, an electronic loading of a specific web page, an electronic loading of a specific portion of an application (such as, for example, loading a page of a social media application, or loading an event page of an application), an electronic transfer of information, or any other electronic transaction. Therefore, pre-fetch program 114 determines whether computing device 120 and computing device 150 are utilizing applications 122/152, and if applications 122/152 are being utilized, pre-fetch program 114 determines if computing device 120 and computing device 150 are utilizing the applications to perform a common transaction type. For example, if pre-fetch program 114 determines that computing device 120 and computing device 150 are utilizing applications 122/152 to split a bill at an establishment, even though the information displayed on each application may not be identical (such as the user being paid, etc.), pre-fetch program 114 would determine that computing device 120 and computing device 150 are utilizing applications 122/152 to perform a common transaction type. In another example, if pre-fetch program 114 determines that computing device 120 and computing device 150 are both utilizing a movie ticket application (application 122/152) and both computing devices are loading a purchase page for a specific movie, pre-fetch program 114 determines that computing device 120 and computing device 150 are executing a common transaction type. Furthermore, in other embodiments, pre-fetch program 114 may additionally analyze the last transaction (or an amount of previous transactions) to determine whether computing device 120 and computing device 150 are executing a common transaction type. For example, if computing device 120 is currently loading the purchase page for a specific movie, but computing device 150 has already finished loading the page, pre-fetch program 114 may analyze the last transaction performed by computing device 150 (the load of the purchase page), compare the transaction type with the currently executing transaction taking place on computing device 120, and determine that computing device 120 and computing device 150 are executing a common transaction type.

As stated above, pre-fetch program 114 further determines whether the second amount of devices exceeds a second threshold amount. In the example embodiment, the second threshold amount may be determined through machine learning techniques in a similar manner as described above, or alternatively, in other embodiments, input by the user of computing device 110. If pre-fetch program 114 determines that the second amount of devices does not exceed the second threshold amount (decision 408, "NO" branch), pre-fetch program 114 pre-fetch program 114 continues monitoring the usage of computing device 110 and the computing devices in the pre-determined vicinity of computing device 110. In the example embodiment, pre-fetch program 114 may specifically continue monitoring the devices contained in the second amount of devices. Referring to the example above, pre-fetch program 114 may continue monitoring the usage of computing device 120 and computing device 150.

If pre-fetch program 114 determines that the second amount of devices does exceed the second threshold amount (decision 408, "YES" branch), pre-fetch program 114 generates a selectable element (such as a selectable user interface element), which, upon selection, loads a portion of application 112 that corresponds to the identified common transaction type, and embeds the selectable element in a notification (step 410). Furthermore, in the example embodiment, pre-fetch program 114 displays the notification to the user of computing device 110. In other embodiments, pre-fetch program 114 may provide the notification or just the selectable element to application 112, which may perform the embedding or display functions stated above. Referring to the example above where the common transaction type is a purchase page for a specific movie, pre-fetch program 114 generates a selectable element that, when selected, loads the purchase page for the specific movie. Furthermore, pre-fetch program 114 embeds the selectable element within a notification, and provides the notification to the user of computing device 110.

Figure 5:
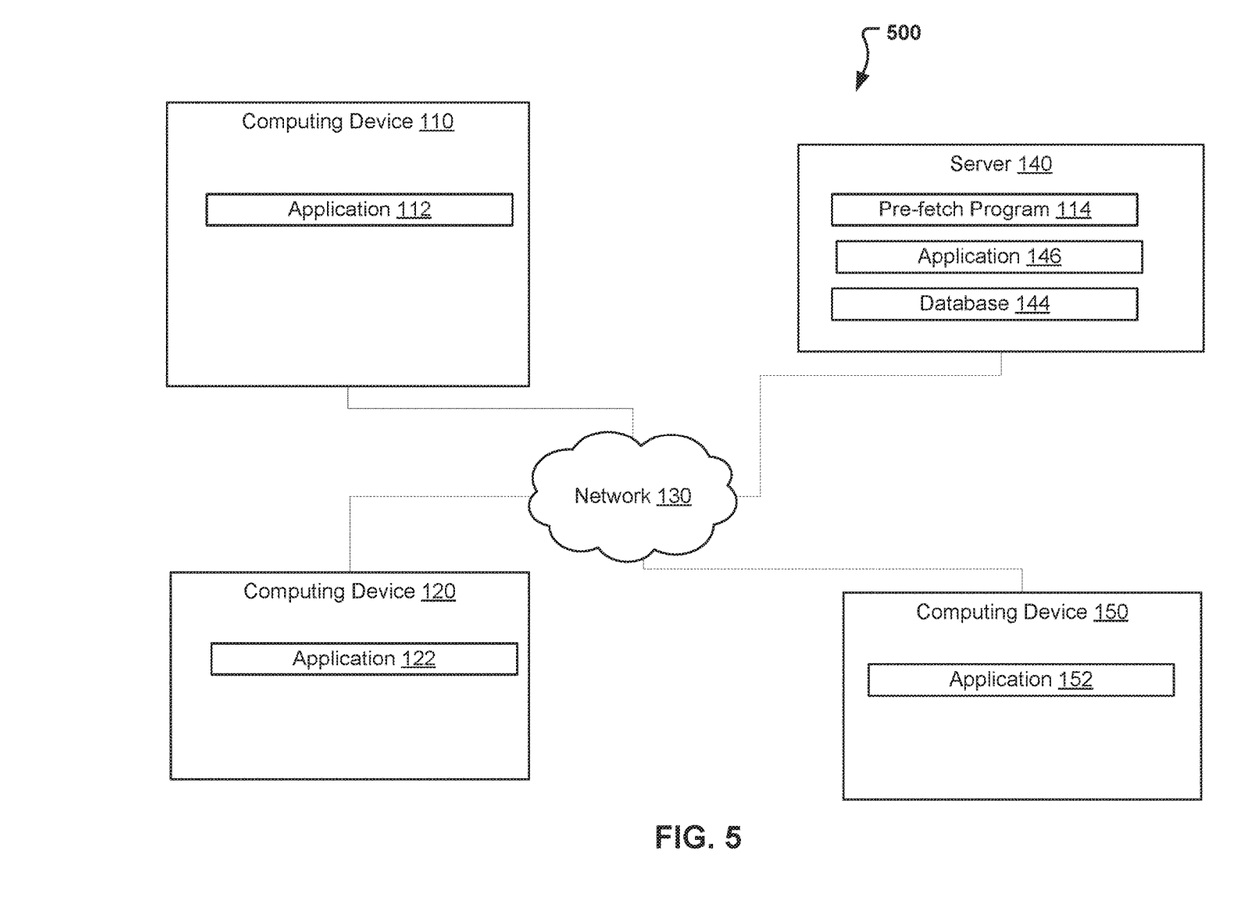
FIG. 5 illustrates an alternative embodiment of the pre-fetch system, in accordance with an embodiment.

FIG. 5 illustrates pre-fetch system 500, an alternative embodiment of pre-fetch system 100, in accordance with an embodiment. In this alternative embodiment, pre-fetch system 500 includes computing device 110, server 140, computing device 120, and computing device 150, interconnected via network 130. However, in this alternative embodiment, pre-fetch program 114 is located on server 140, and therefore the processes outlined in FIGS. 2, 3, and 4, including the monitoring of computing device 110 and computing devices in the environment of computing device 110, such as computing device 120 and computing device 150, are performed server side via network 130.

In additional embodiments, a client side pre-fetch program may be present on computing device 110. Therefore, pre-fetch program 114 may utilize the client side pre-fetch program on computing device 110 to monitor computing device 110 and computing devices in the environment of computing device 110, or just to monitor computing device 110 (with the monitoring of the devices in the environment of computing device 110 being done by pre-fetch program 114 via network 130). Furthermore, in additional embodiments, pre-fetch program 114 may be located on a server that does not provide server side support (or is not associated) with the application being monitored on the computing devices in the system. Therefore, in this additional embodiment, pre-fetch program 114 may be located on a different server than server 140, with server 140 including application 146 and database 144 as depicted.

Furthermore, in one or more embodiments, in predicting an intent of the user of computing device 110 to utilize application 112, pre-fetch program 114 may quantify a usage of the application by his or her friends or associates by utilizing one or more of spatial indexing of the user of computing device 110's social graphs node, utilizing Hilbert curves, a quad tree, or machine learning techniques as discussed above.

With regard to FIGS. 2, 3, and 4, in further embodiments, pre-fetch program 114 may monitor the usage of multiple applications across computing device 110 and computing devices in the environment of computing device 110. Therefore, based on the monitoring, pre-fetch program 114 may first determine which application to pre-fetch data for, based on the pre-fetch situation, prior to pre-fetching the relevant data. For example, if computing device 120 and computing device 150 are executing a first application, pre-fetch program 114 may monitor and perform the process described above, and further determine to pre-fetch data corresponding to the first application. However, if computing device 120 and computing device 150 are executing a second application, pre-fetch program 114 may determine to pre-fetch data corresponding to the second application. If a first plurality of devices are executing a first application and a second plurality of devices are executing a second application, pre-fetch program 114 may determine which application (if any) to pre-fetch data for based on factors such as the level of association the users of each plurality of devices have with the user of computing device 110, the application that the user of computing device 110 utilizes more often, the location of computing device 110 (if certain locations, the user of computing device 110 may utilize the first application more often), or any of the other factors discussed above.

Furthermore, in additional embodiments, with regard to FIGS. 2, 3, and 4, pre-fetch program 114 may determine whether to pre-fetch data corresponding to an application based on determining that a single computing device (with a user associated with the user of computing device 110) is currently executing the application, and may further generate a selectable element, as described in FIG. 4, based on the transaction type the single computing device is executing.

Figure 6:
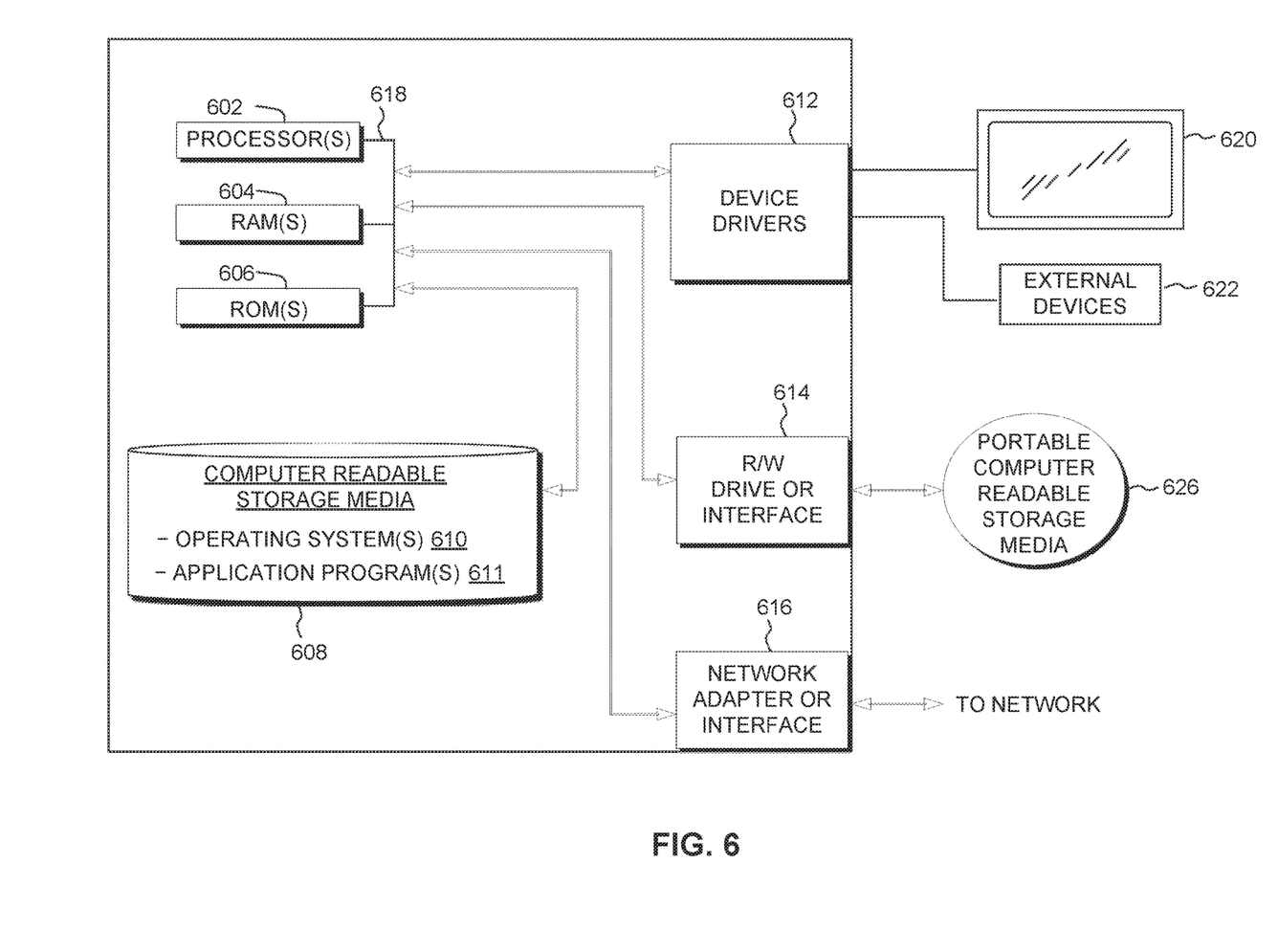
FIG. 6 is a block diagram depicting the hardware components of the pre-fetch system of FIGS. 1 and 5, in accordance with an embodiment.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

FIG. 6 depicts a block diagram of components of computing devices contained in pre-fetch system 100 of FIG. 1 and pre-fetch system 500 in FIG. 5, in accordance with an embodiment. It should be appreciated that FIG. 6 provides only an illustration of one implementation and does not imply any limitations with regard to the environments in which different embodiments may be implemented. Many modifications to the depicted environment may be made.

Computing devices may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, pre-fetch program 114, are stored on one or more of the computer readable storage media 608 for execution by one or more of the processors 602 and by utilizing one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 614 to read from and write to one or more portable computer readable storage media 626. Application programs 611 on the computing devices may be stored on one or more of the portable computer readable storage media 626, read via the respective R/W drive or interface 614 and loaded into the respective computer readable storage media 608.

Computing devices may also include a network adapter or interface 616, such as a TCP/IP adapter card or wireless communication adapter (such as a 4G wireless communication adapter using OFDMA technology). Application programs 611 on the computing devices may be downloaded to the computing devices from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Computing devices may also include a display screen 620, and external devices 622, which may include, for example a keyboard, a computer mouse and/or touchpad. Device drivers 612 interface to display screen 620 for imaging, to external devices 622, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
   one or more computer-readable memories storing program instructions; and
   one or more processors configured to execute the program instructions to cause the system to perform operations comprising:
      determining that one or more computing devices are within a threshold distance of a computing device of a first user, and are each currently executing a respective instance of a first application;
      in response to the determining that the one or more computing devices are each currently executing the respective instance of the first application, identifying that at least a portion of the one or more computing devices correspond to one or more users that are associated with the first user;
      in response to the identifying that the at least the portion of the one or more computing devices correspond to the one or more users that are associated with the first user, determining that a current usage of the first application by at least a first set of computing devices of the at least the portion of the one or more computing devices corresponds to a first transaction type; and
      generating a selectable element configured to, upon selection, load a user interface on the computing device of the first user that corresponds to the first transaction type.

2. The system of claim 1, wherein the first transaction type is an electronic financial transaction.

3. The system of claim 1, wherein the first transaction type is a load of a specific portion of the first application.

4. The system of claim 1, the operations further comprising embedding the selectable element into an electronic message that is displayed to first user.

5. The system of claim 1, wherein the identifying that at least a portion of the one or more computing devices correspond to one or more users that are associated with the first user further comprises determining that an amount of computing devices contained in the at least the portion of the one or more computing devices exceeds a first threshold amount.

6. The system of claim 1, the operations further comprising determining that an amount of computing devices contained in the at least the first set of computing devices exceeds a second threshold amount.

7. The system of claim 1, wherein the threshold distance is determined by monitoring usage of the computing device of the first user and computing devices in an environment of the computing device of the first user.

8. A system, comprising:
   one or more computer-readable memories storing program instructions; and
   one or more processors configured to execute the program instructions to cause the system to perform operations comprising:
      monitoring usage of an application on a computing device;

based on the monitoring, identifying pre-fetch one or more situations corresponding to a user of the computing device, the identifying comprising determining a likelihood percentage corresponding to a likelihood that the user of the computing device utilizes the application when in a specific location type exceeds a first threshold percentage;

determining whether the computing device is in a situation that corresponds to at least one of the identified one or more pre-fetch situations; and in response to determining that the computing device is in the situation that corresponds to the at least one of the identified one or more pre-fetch situations, causing data corresponding to the application to be pre-fetched.

9. The system of claim 8, wherein the determining whether the computing device is in the situation that corresponds to at least one of the identified one or more pre-fetch situations includes detecting whether the computing device is located in the specific location type.

10. The system of claim 8, wherein the identifying the one or more pre-fetch situations further corresponding to the user of the computing device includes determining an amount a number of users currently utilizing the application within a predetermined vicinity of the user of the computing device that causes the user of the computing device to utilize the application more than a second threshold percentage.

11. The system of claim 10, wherein the determining whether the computing device is in the situation that corresponds to at least one of the identified one or more pre-fetch situations includes determining that a number of users that are within a predetermined vicinity of the user of the computing device and are currently utilizing a computing device exceeds a third threshold amount.

12. The system of claim 8, wherein the causing data corresponding to the application to be pre-fetched includes causing a specific portion of the application to be pre-fetched.

13. The system of claim 8, wherein the operations further comprise storing the at least one of the identified one or more pre-fetch situations on the computing device.

14. A method, comprising:
determining that one or more computing devices are within a threshold distance of a computing device of a first user, and are each currently executing a respective instance of a first application;

in response to the determining that the one or more computing devices are each currently executing the respective instance of the first application, identifying that at least a portion of the one or more computing devices correspond to one or more users that are associated with the first user; and in response to the identifying that the at least the portion of the one or more computing devices correspond to the one or more users that are associated with the first user, causing data corresponding to the first application to be pre-fetched.

15. The method of claim 14, wherein the identifying that at least a portion of the one or more computing devices correspond to one or more users that are associated with the first user includes referencing a database to determine that the first user has previously transacted with the one or more users.

16. The method of claim 14, wherein the identifying that at least a portion of the one or more computing devices correspond to one or more users that are associated with the first user includes determining that a social media account of the first user is associated with one or more social media accounts of the one or more users.

17. The method of claim 14, wherein the causing data corresponding to the first application to be pre-fetched includes transmitting an electronic message to the first application instructing the first application to pre-fetch the data corresponding to the first application.

18. The method of claim 14, wherein the identifying that at least a portion of the one or more computing devices correspond to one or more users that are associated with the first user further comprises determining that a number of computing devices contained in the at least the portion of the one or more computing devices exceeds a first threshold amount.

19. The method of claim 14, wherein the data that is pre-fetched corresponds to a specific portion of the first application.

20. The method of claim 14, wherein the threshold distance is determined by monitoring usage of the computing device of the first user and computing devices in an environment of the computing device of the first user.

* * * * *

UNITED STATES PATENT AND TRADEMARK OFFICE
CERTIFICATE OF CORRECTION

PATENT NO. : 10,372,610 B2
APPLICATION NO. : 15/675453
DATED : August 6, 2019
INVENTOR(S) : Cheng Tian, Braden Christopher Ericson and Titus Woo Page 1 of 1

It is certified that error appears in the above-identified patent and that said Letters Patent is hereby corrected as shown below:

In the Claims

In Column 17, Lines 1 and 2, delete "pre-fetch one or more situations" and add "one or more pre-fetch situations".

In Column 17, Lines 23 and 24, delete "an amount"

Signed and Sealed this
Twenty-ninth Day of October, 2019

Andrei Iancu
*Director of the United States Patent and Trademark Office*